United States Patent
Bahety et al.

(10) Patent No.: US 10,972,273 B2
(45) Date of Patent: Apr. 6, 2021

(54) SECURING AUTHORIZATION TOKENS USING CLIENT INSTANCE SPECIFIC SECRETS

(71) Applicant: eBay Inc., San Jose, CA (US)

(72) Inventors: Anand Baldeodas Bahety, San Jose, CA (US); Nebojsa Pesic, Los Gatos, CA (US); Mallikarjuna Potta, San Jose, CA (US)

(73) Assignee: eBay Inc., San Jose, CA (US)

( * ) Notice: Subject to any disclaimer, the term of this patent is extended or adjusted under 35 U.S.C. 154(b) by 452 days.

(21) Appl. No.: 15/622,834

(22) Filed: Jun. 14, 2017

(65) Prior Publication Data

US 2018/0367306 A1    Dec. 20, 2018

(51) Int. Cl.
*H04L 9/32* (2006.01)
*G06Q 20/40* (2012.01)
(Continued)

(52) U.S. Cl.
CPC ....... *H04L 9/3213* (2013.01); *G06Q 20/3821* (2013.01); *G06Q 20/40* (2013.01);
(Continued)

(58) Field of Classification Search
CPC ... H04L 9/3213; H04L 9/0861; H04L 9/3297; H04L 63/0884; H04L 9/3234;
(Continued)

(56) References Cited

U.S. PATENT DOCUMENTS 5,542,046 A * 7/1996 Carlson ............... G06F 12/1408
340/5.74
7,596,530 B1 * 9/2009 Glasberg ............... G06Q 20/02
705/30
(Continued)

FOREIGN PATENT DOCUMENTS

WO    2013109857    7/2013
WO    2018/231495 A1    12/2018

OTHER PUBLICATIONS

"International Application Serial No. PCT US2018 034542, International Search Report dated Aug. 3, 2018", 5 pgs.
(Continued)

*Primary Examiner* — Samson B Lemma
*Assistant Examiner* — Abdullah Almamun
(74) *Attorney, Agent, or Firm* — Shook, Hardy & Bacon LLP

(57) ABSTRACT

A system, method, and computer program product are provided for securing authorization tokens using client instance specific secrets. Tokens are valid for service requests only if time constraints and additional security constraints are met by additional information stored in the token in hashed form. A required comparison of a timestamp in a client service request header to the current server time limits the useful token life, e.g., to a few minutes. The service request header also includes data generated based on a secret previously assigned to a specific client instance. The secret may be generated by the server according to a public/private key scheme and sent to a particular client
(Continued)

instance only once, e.g., during initial device registration. The secret may be omitted from service requests for public information. Service request headers may include device identifiers, so that service requests from known rogue clients may be ignored.

17 Claims, 10 Drawing Sheets

(51) Int. Cl.
  *H04L 29/06* (2006.01)
  *G06Q 20/38* (2012.01)
  *G06Q 30/06* (2012.01)
  *H04L 9/08* (2006.01)

(52) U.S. Cl.
  CPC ....... *G06Q 30/0601* (2013.01); *H04L 9/0861* (2013.01); *H04L 9/3234* (2013.01); *H04L 9/3242* (2013.01); *H04L 9/3297* (2013.01); *H04L 63/0807* (2013.01); *H04L 63/0884* (2013.01); *H04L 63/0815* (2013.01); *H04L 2463/121* (2013.01)

(58) Field of Classification Search
  CPC ............... H04L 9/3242; H04L 63/0807; H04L 63/0815; H04L 2463/121; G06Q 20/3821; G06Q 30/0601; G06Q 20/40
  See application file for complete search history.

(56) References Cited

U.S. PATENT DOCUMENTS

| | | | | |
|---|---|---|---|---|
| 8,185,942 B2* | 5/2012 | Farrugia | ............... | H04L 9/3271 726/9 |
| 8,543,091 B2 | 9/2013 | Mardikar | | |
| 8,543,829 B2 | 9/2013 | Von Krogh | | |
| 8,843,999 B1* | 9/2014 | Vasquez | ............. | H04L 65/1006 726/28 |
| 8,949,935 B2* | 2/2015 | Alsina | ................. | H04L 63/0807 726/2 |
| 9,059,853 B1 | 6/2015 | Bortz et al. | | |
| 9,282,106 B2 | 3/2016 | Fahrny et al. | | |
| 9,755,834 B1* | 9/2017 | Johnson | ................. | H04L 67/18 |
| 2007/0056023 A1* | 3/2007 | Leung | .................... | H04L 63/08 726/4 |
| 2009/0136042 A1* | 5/2009 | Veillette | .............. | H04L 63/0807 380/279 |
| 2009/0150678 A1* | 6/2009 | Li | .......................... | H04L 63/083 713/183 |
| 2010/0082985 A1* | 4/2010 | Adams | .................. | H04L 9/3297 713/170 |
| 2010/0278336 A1* | 11/2010 | Tahan | ................... | H04L 9/3242 380/46 |
| 2011/0131108 A1* | 6/2011 | Doxey | ............... | G06Q 30/0601 705/26.1 |
| 2011/0239283 A1* | 9/2011 | Chern | ................. | H04L 63/0815 726/6 |
| 2012/0117214 A1* | 5/2012 | Mengle | ................. | G06F 9/5055 709/223 |
| 2012/0151566 A1* | 6/2012 | Lin | ....................... | H04L 9/0838 726/7 |
| 2013/0191884 A1 | 7/2013 | Leicher et al. | | |
| 2014/0019752 A1* | 1/2014 | Yin | ..................... | H04L 63/0435 713/155 |
| 2014/0053671 A1 | 2/2014 | Matsumoto | | |
| 2015/0269566 A1 | 9/2015 | Gaddam | | |
| 2016/0283740 A1 | 9/2016 | Roundtree | | |
| 2017/0019460 A1* | 1/2017 | Gu | .......................... | H04L 67/12 |
| 2019/0354942 A1* | 11/2019 | Nakamura | ......... | G06Q 20/0457 |

OTHER PUBLICATIONS

"International Application Serial No. PCT US2018 034542, Written Opinion dated Aug. 3, 2018", 9 pgs.

International Report on Patentability received for PCT Application No. PCT/US2018/034542, dated Dec. 26, 2019, 9 pages.

* cited by examiner

SECURING AUTHORIZATION TOKENS USING CLIENT INSTANCE SPECIFIC SECRETS

TECHNICAL FIELD

The present disclosure relates to more effectively securing authorization tokens, such as those used to access online publication and commerce systems, to help prevent fraudulent activities related to authorization token theft.

BACKGROUND

As the use of network-based publication systems and marketplaces such as online commerce services or auction services expands, and the volume of item listings in such applications increases, the speed, ease, safety, and convenience with which product information that is relevant to customers may be retrieved from such marketplaces increases in importance to customers. Securing access to protected network resources, particularly over public network links, is increasingly important as information and financial capabilities continue to move online.

BRIEF DESCRIPTION OF DRAWINGS

Some embodiments are illustrated by way of example and not limitation in the figures of the accompanying drawings in which.

DETAILED DESCRIPTION

Figure 1:
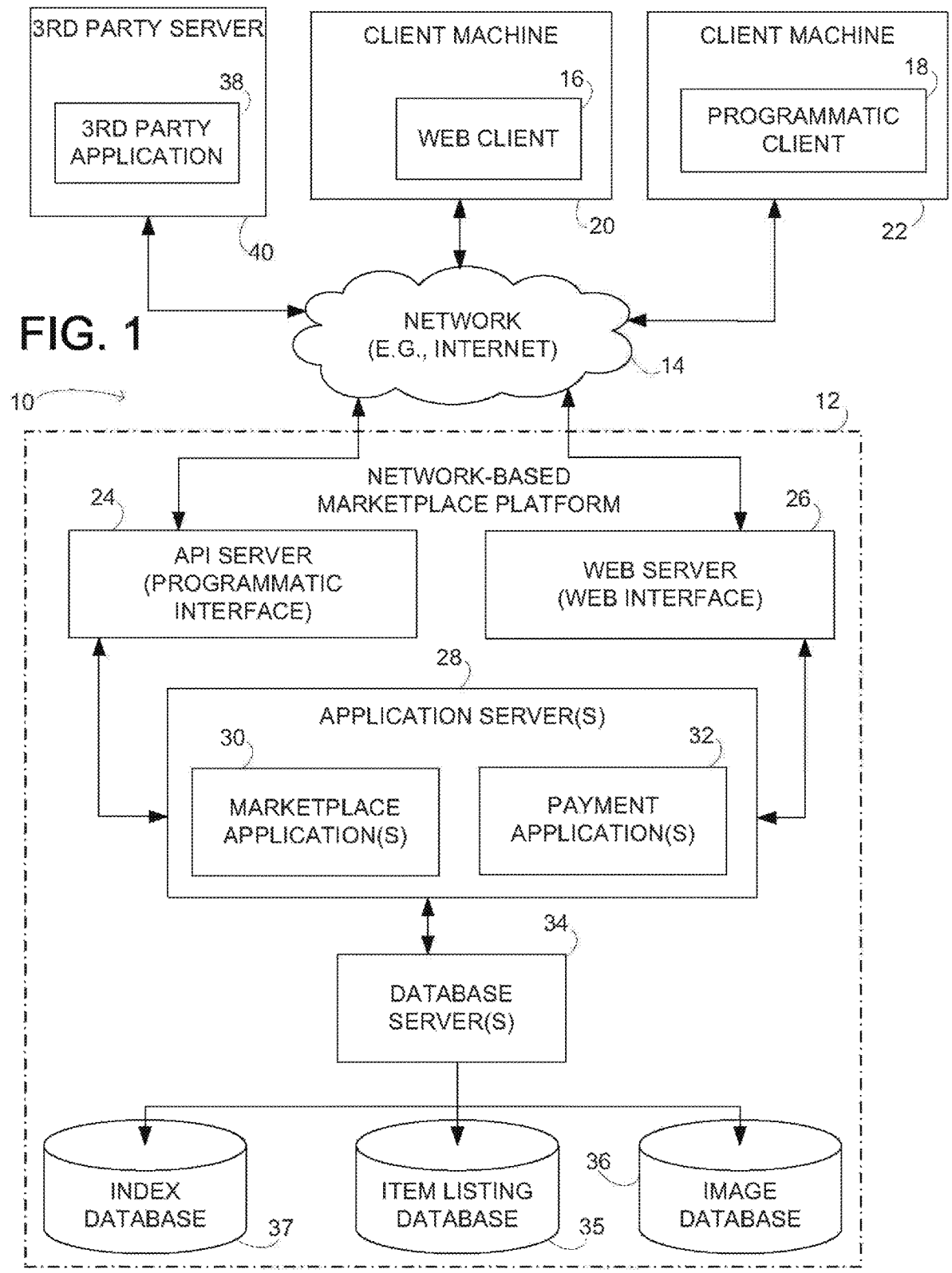
FIG. 1 is a block diagram illustrating a publication system in the example form of a network-based marketplace system.

In the following description, for purposes of explanation, numerous specific details are set forth in order to provide a thorough understanding of some example embodiments. It will be evident, however, to one skilled in the art that the present embodiments may be practiced without these specific details. Examples merely typify possible variations. Unless explicitly stated otherwise, components and functions are optional and may vary in sequence or be combined or subdivided.

An authorization token is a piece of data used in network communications to identify a particular session. A session may be defined as a series of related message exchanges. Authorization tokens are needed where the communications infrastructure uses a stateless protocol such as HTTP (HyperText Transfer Protocol), to signify that a user's interactions are in a particular current state.

For example, a buyer who visits a seller's network site will typically collect a number of items in a virtual shopping cart and then finalize the shopping by going to the site's checkout page. This process generally involves an ongoing communication, where the client requests several web pages or other documents which are responsively sent by the site's server. In such a situation, the authorization token may be used to store the current state of the shopper's cart.

Authorization tokens are advantageous because the client may only need to handle a small piece of data which is otherwise meaningless and thus presents minimal security risk. Further, the session data is generally stored on the server associated with the authorization token, e.g., in a database to which the client does not have direct access. Yet authorization token theft remains a weak security link. Authorization tokens may be stolen in various ways, including most typically eavesdropping, e.g., copying of authorization tokens exposed over a public network.

An authorization token may be granted to a visitor upon a visitor's first visit to a network site, such as a web site on the internet. Authorization tokens are often used to identify a specific user who has logged into a network location, and to confirm that the user has particular access privileges. An attacker may therefore hijack a session by mimicking the user, e.g., fraudulently obtaining access privileges by somehow acquiring and then using the user's authorization token. That is, because existing authorization tokens are "bearer" tokens, they can be used by anyone in unintended contexts, including use by a client who is not actually the client authorized by the token.

The OAUTH 2.0 specification is currently one of the most widely used open standards for network authorization (rather than authentication). Its approach allows users to authorize network locations or applications to access their information stored on other sites without requiring the users to provide passwords. OAUTH 2.0 provides specific authorization flows for web applications, desktop applications, and mobile phones. However, authentication issues with OATH 2.0 remain contentious and unresolved.

With the OAUTH 2.0 specification, authorization token validity can be reduced to a few hours if refresh tokens are supported. A refresh token is a special kind of token that can be used to obtain a renewed authorization token at any time. Refresh tokens must be stored securely by an application (i.e., not in a browser) because they allow a user to remain authenticated essentially forever in practical terms, although they do eventually expire. Refresh tokens must be issued only to a single authenticated client to prevent use of leaked authorization tokens by other parties. Leaked refresh tokens can however be blacklisted by an authorization server. In the OAUTH 2.0 token management approach, the client must present the refresh token along with a few application secrets to get a new authorization token. The refresh token is stored at the client side and validated by the OAUTH end point for authorization token renewal.

There are two basic problems with the OAUTH 2.0 specification:
1) Authorization tokens can be stolen and replayed to invoke services such as buying, selling, transferring funds, etc., and
2) Refresh tokens can be stolen and replayed to get new authorization tokens.

Currently, there is no significant mitigation available for refresh token or authorization token theft. If an authorization token is stolen by a fraudster, then the fraudster may easily perform many activities on a secured network site. Those activities may include making undesired purchases or financial transfers, or copying, modifying, or deleting information, for example.

The present inventors have conceived a solution to the current authorization token management problem: generate and assign a secret to the client instance, where the secret is required to generate valid service requests. That way, not all of the "power", as it were, is put into an authorization token as under present network security practices, wherein any client can use a stolen authorization token essentially without restriction. The authorization token is constrained for use by a single particular authorized client instance under the embodiments to be described. This approach renders a stolen authorization token less useful and dangerous than a bearer token in conventional schemes. Indeed, the technical solution presented to the technical problem described prevents a fraudster from performing any activities at all with stolen authorization tokens.

The system, method, and computer program product disclosed herein may provide improved security for authorization tokens for shoppers on networked publishing and ecommerce sites. Accordingly, one or more of the methodologies discussed herein may prevent fraudulent use of stolen authorization tokens without the need to invoke refresh tokens. The methodologies may have the technical effect of reducing computing resources used by one or more devices within the system. Examples of such computing resources include, without limitation, processor cycles, network traffic, memory usage, storage space, and power consumption.

In one example, a method for generating and validating authentication tokens may include defining a particular secret for a specific client instance; formulating an authorization token, using at least one hardware-implemented processor of a client computer, based on a hashing key and a hashing algorithm received from a server at an initial client registration, the secret, and a current client timestamp; sending a service request from the client instance to the server, the service request comprising the authorization token and authentication token attributes; validating the authorization token at the server by comparing the authorization token with a token calculated by the server from the secret, the hashing key, and the hashing algorithm; and granting the service request if the authorization token is successfully validated.

In another example, a system for generating and validating authentication tokens may include a hardware-implemented processor and a memory that are configured to execute stored instructions to define a particular secret for a specific client instance; formulate an authorization token, using at least one hardware-implemented processor of a client computer, based on a hashing key and a hashing algorithm received from a server at an initial client registration, the secret, and a current client timestamp; send a service request from the client instance to the server, the service request comprising the authorization token and authentication token attributes; validate the authorization token at the server by comparing the authorization token with a token calculated by the server from the secret, the hashing key, and the hashing algorithm; and grant the service request if the authorization token is successfully validated.

In a further example, a non-transitory computer-readable hardware medium may store program instructions that, when executed by at least one hardware-implemented processor of a computer, cause the computer to execute operations for generating and validating authorization tokens including defining a particular secret for a specific client instance; formulating an authorization token, using at least one hardware-implemented processor of a client computer, based on a hashing key and a hashing algorithm received from a server at an initial client registration, the secret, and a current client timestamp; sending a service request from the client instance to the server, the service request comprising the authorization token and authentication token attributes; validating the authorization token at the server by comparing the authorization token with a token calculated by the server from the secret, the hashing key, and the hashing algorithm; and granting the service request if the authorization token is successfully validated.

More details of the embodiments of the present invention are now provided in the exemplary and non-limiting environment of a network-based publication and commerce system.

One example of a distributed network implementing a publication system is illustrated in the network diagram of FIG. 1, which depicts a system 10 using a client-server type architecture. A commerce platform, in the example form of a network-based marketplace platform 12, provides server-side functionality, via a network 14 (e.g., the Internet) to one or more clients. As illustrated, the platform 12 may interact with a web client 16 executing on a client machine 20 and a programmatic client 18 executing on a client machine 22. In one embodiment, web client 16 is a web browser, but it may employ other types of web services.

Turning specifically to the exemplary network-based marketplace platform 12, an Application Program Interface (API) server 24 and a web server 26 are coupled to, and provide programmatic and web interfaces respectively to, one or more application servers 28. The application servers 28 may host one or more customized marketplace applications 30 and payment applications 32. The application servers 28 are, in turn, shown to be coupled to one or more databases servers 34 that may facilitate access to a number of specialized databases, including an item listing database 35, an image database 36, and an index database 37. The item listing database 35 may store data indicative of item listings for items which are offered for sale or auction on the platform 12.

Each item listing may include, inter alia, a text description of the relevant item and metadata categorizing the item. The image database 36 may include images associated with respective item listings in the item listing database 35. The images in the image database 36 may be standard format image files such as Joint Photographic Expert Group (JPEG) files. The index database 37 may contain index data relating to images in the image database to permit image-based searching of the image database 36.

The marketplace applications 30 may provide a number of specific marketplace functions and services to users that access the marketplace platform 12. The payment applications 32 likewise may provide a number of specific payment services and functions to users. The payment applications 32 may allow users to quantify and accumulate value (e.g., in a commercial currency, such as the U.S. dollar, or a proprietary currency, such as "points") in accounts, and then to later redeem the accumulated value for products (e.g., goods or services) that are made available via the marketplace applications 30. While the marketplace and payment applications 30 and 32 are shown in FIG. 1 to both form part of the network-based marketplace platform 12, it will be appreciated that, in alternative embodiments, the payment applications 32 may form part of a payment service that is separate and distinct from the marketplace platform 12.

Further, while the system 10 shown in FIG. 1 employs a client-server architecture, the present disclosure is, of course, not limited to such an architecture, and could equally well find application in a distributed, or peer-to-peer, architecture system. The various marketplace and payment applications 30 and 32 could also be implemented as standalone software programs, which do not necessarily have networking capabilities. Additionally, while example embodiments are described with respect to the marketplace platform 12, alternative embodiments may be contemplate use on a publication platform or other non-commerce platforms.

The web client 16, it will be appreciated, may access the various marketplace and payment applications 30 and 32 via the web interface supported by the web server 26. Similarly, the programmatic client 18 may access the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace platform 12 in an off-line manner, and to perform batch-mode communications between the programmatic client 18 and the network-based marketplace platform 12.

FIG. 1 also illustrates a third party application 38, executing on a third party server machine 40, as having programmatic access to the network-based marketplace via the programmatic interface provided by the API server 24. For example, the third party application 38 may, utilizing information retrieved from the network-based marketplace platform 12, support one or more features or functions on a web site hosted by the third party. The third party web site may, for example, provide one or more promotional, marketplace or payment functions that are supported by the relevant applications of the network-based marketplace platform 12.

Figure 2:
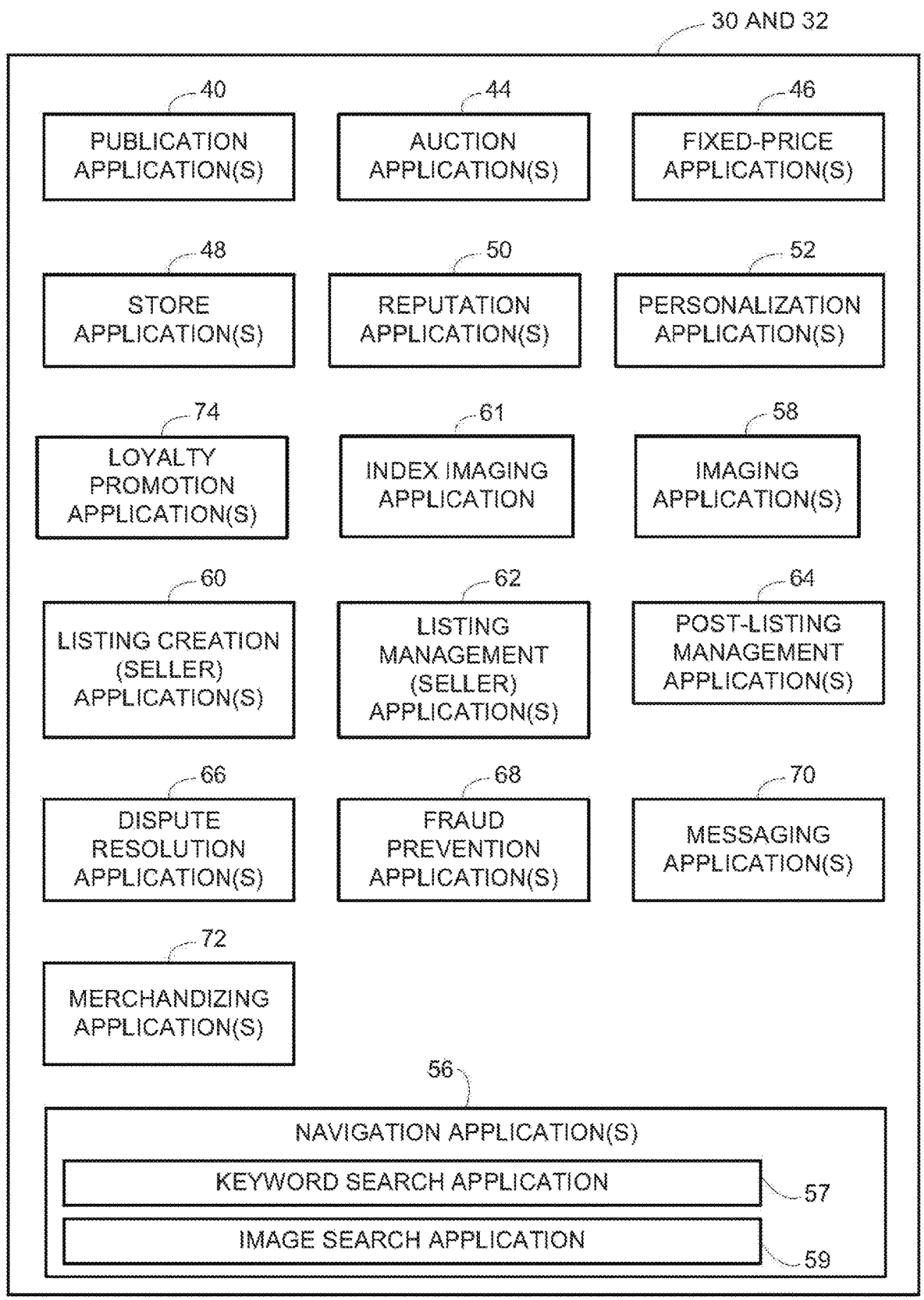
FIG. 2 is a diagrammatic representation of customized marketplace and payment applications.

FIG. 2 is a block diagram illustrating multiple marketplace and payment applications 30 and 32 that may be provided as part of the network-based marketplace platform 12. The marketplace platform 12 may provide a number of specialized listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include at least one publication application 40 and one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy bidding feature whereby a bidder may invoke automated proxy bidding.

A number of fixed-price applications 46 may support fixed-price listing formats (e.g., the traditional classified advertisement-type listing or a catalogue listing) and buy-out-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives, and features that are specific and personalized to a relevant seller.

Reputation applications 50 allow parties that transact utilizing the network-based marketplace platform 12 to establish, build, and maintain reputations, which may be made available and published to potential trading partners. Consider that where, for example, the network-based marketplace platform 12 supports person-to-person trading, users may have no history or other reference information whereby the trustworthiness and credibility of potential trading partners may be assessed. The reputation application 50 allows a user (for example, through feedback provided by other transaction partners) to establish a reputation within the network-based marketplace platform 12 over time. Other potential trading partners may then reference such a reputation for the purposes of assessing credibility and trustworthiness.

Personalization applications 52 allow users of the marketplace platform 12 to personalize various aspects of their interactions with the marketplace platform 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace and other parties.

In one embodiment, the network-based marketplace platform 12 may support a number of marketplaces that are customized, for example, for specific geographic regions. A version of the marketplace may be customized for the United Kingdom, whereas another version of the marketplace may be customized for the United States. Each of these versions may operate as an independent marketplace, or may be customized (or internationalized) presentations of a common underlying marketplace.

Navigation of the network based-marketplace may be facilitated by one or more navigation applications 56. For example, a keyword search application 57 enables keyword searches of listings published via the marketplace platform 12. Similarly, an image search application 59 enables an image-based search of item listings published via the marketplace platform 12. To perform an image-based search, a user may submit a query image, whereupon the image search application 59 may compare the query image to images in the image database to produce a result list of item listings based on a similarity ranking between the query image and the images associated with the respective item listings. The similarity ranking may be established by parsing or processing the query image to provide index data, and thereafter comparing the query image's index data to pre-compiled index data for the listing images. A browsing application may allow users to browse various category, catalogue, or inventory data structures according to which listings may be classified within the marketplace platform 12. Various other navigation applications may be provided to supplement the search and browsing applications.

In order to make listings available via the network-based marketplace as visually informative and attractive as possible, as well as to enable image-based searching, the marketplace applications 30 may include one or more imaging applications 58, which users may use to upload images for inclusion within listings. Images thus uploaded are stored in the image database 36, with each image being associatively linked to at least one item listing in the item listing database 35. One of the imaging applications 58 may also operate to incorporate images within viewed listings. The imaging applications 58 may also support one or more promotional features, such as image galleries that are presented to potential buyers. For example, sellers may pay an additional fee to have an image included within a gallery of images for promoted items.

The marketplace platform 12 may also include an image indexing application 61 to parse or process images uploaded via the imaging application 58, as well as to parse or process query images submitted via the image search application 59. Index data is the result of processing images by the image indexing application 61 and is stored in the index database 37.

Listing creation applications 60 may allow sellers to conveniently author listings pertaining to goods or services that they wish to transact via the marketplace platform 12, and listing management applications 62 may allow sellers to manage such listings. Specifically, where a particular seller has authored and/or published a large number of listings, the management of such listings may present a challenge. The listing management applications 62 may provide a number of features (e.g., auto-relisting, inventory level monitors, etc.) to assist the seller in managing such listings. One or more post-listing management applications 64 may also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 may provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace. One of the fraud prevention applications 68 may include automatic image comparison, by use of index data produced by the image indexing application 61 and stored in the index database 37. Such image comparison may be used by the fraud prevention application 68 automatically to detect listing images similar to the query image, and to alert a fraud assessor to such image listings, so that the human assessor can examine the identified item listing to determine whether the identified item listing is a fraudulent listing.

Messaging applications 70 may enable the generation and delivery of messages to users of the network-based marketplace platform 12. Such messages may, for example, advise users regarding the status of listings at the marketplace (e.g., providing "outbid" notices to bidders during an auction process or providing promotional and merchandising information to users).

Merchandizing applications 72 may support various merchandizing functions that are made available to sellers to enable sellers to increase sales via the marketplace platform 12. The merchandizing applications 72 also operate the various merchandizing features that may be invoked by sellers and may monitor and track the success of merchandizing strategies employed by sellers.

Note that each of the applications previously described is customized to enable a specific function to be performed by a user. Each application comprises specific computer-executable code structures to inventively implement the functionality described. Further, specific logic structures and hardware circuitry may also implement the inventive concepts described herein.

The present inventors have realized that the marketplace platform 12 described above may be improved if client application instances and services are provided with additional new specialized functionality that enables them to render stolen authorization tokens effectively useless. Theft of a conventional authorization token is sufficient to spoof both user authentication and authorization to access the user's network resources, since conventional authorization tokens alone are used for both. This dependence on the authorization token increases the criticality of token theft consequences. The present inventors have realized, among other things, that a different approach for authenticating an authorization token may increase user security in a network, with no significant user impact or inconvenience.

An authorization token may comprise a unique identifier, such as a hash generated by a hash function. A server may generate such a hash and send it to a client to identify the current interaction session. The client may store the authorization token, for example as an HTTP cookie, and then send the authorization token with various service requests.

In some cases, the authorization token may comprise a keyed hash-based message authentication code (HMAC), sometimes called a signature. The signature may simultaneously verify both the data integrity and the authentication of the message, because it may generally only be calculated by a client device that possesses a particular HMAC key and a particular HMVAC algorithm that together generate the signature from a particular input message. The input message may comprise a private key or other secret value that is known only to that specific server and to that specific client, as well as service request data.

The client instance may create a unique HMAC for each service request by hashing the service request data with the private key, and then send the HMAC as part of a service request. Once the server receives the service request and generates its own unique HMAC based on stored data associated with a particular client, the server may compare the two HMACs. If they are equal, the server may determine the client is trusted and then proceed to execute the service request. Although this disclosure describes the embodiments in terms of an HMAC based solution, the invention is not so limited. Embodiments using other encryption schemes, such as public key or asymmetric encryption are also within the scope of the invention.

Figure 3:
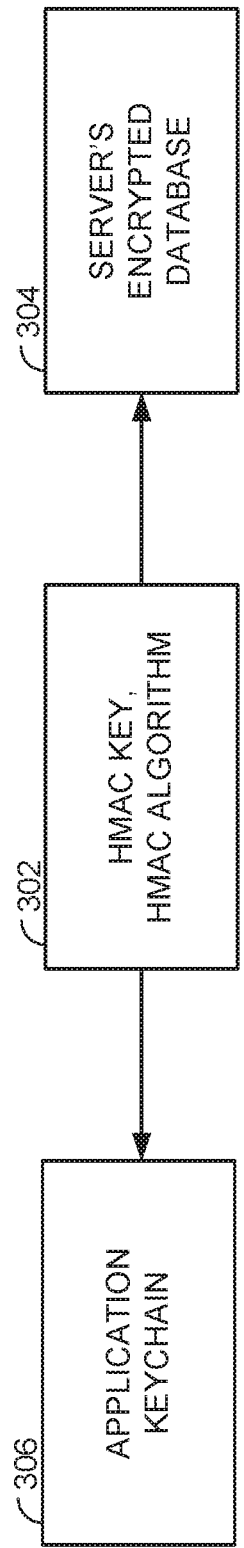
FIG. 3 is a diagrammatic representation of a system for assigning and distributing a hash-based message authentication code (HMAC) key and an HMAC algorithm, in accordance with a disclosed embodiment.

FIG. 3 is a diagrammatic representation of a system for assigning and distributing a hash-based message authentication code (HMAC) key and an HMAC algorithm, in accordance with a disclosed embodiment. During the initial device registration process 302 for example, a server may generate the HMAC key along with the HMAC algorithm.

The server may securely store the HMAC key and the HMAC algorithm in an encrypted database 304. The server may also provide the HMAC key and the HMAC algorithm to a particular client instance. The server may also assign a device identifier (DeviceID) to a particular client instance, which may also be stored at both the client and the server.

The client instance may store the HMAC key and HMAC algorithm in an application keychain 306 within the client device executing the client instance of a mobile application for example. When the client instance later generates a service request, it may select a particular HMAC key and an HMAC algorithm to be used in generating an authorization token (i.e., the HMAC) by referring to an index of the application keychain 306. The client instance may calculate the HMAC using its stored HMAC key and its stored HMAC algorithm, and then send the HMAC to the server as part of its service request. The HMAC may be generated from an input message, which may comprise the DeviceID or another secret, as well as the request data.

In an embodiment, the server may generate a private key and a public key for an asymmetric cryptographic function, and provide the private key to the client instance once, during an initial client device registration process. In another embodiment, the client instance may internally generate a private key and a public key for an asymmetric cryptographic function, and use the private key as the secret. This approach avoids the need for the server to provide the secret to the client instance. The client device executing the client instance may place the private and public keys into its secure storage, and may share the public key with the server. The client instance may send the public key to the server with server requests for use in request validation, so that the server need not retrieve the public key from its own storage. The public key may be indicated by an index in authorization token attributes, rather than sent as a copy. The client device however never shares its private key.

At the server side, the server may independently recalculate the HMAC using the HMAC key and HMAC algorithm associated with the particular client device that originated the service request. The server may for example retrieve the HMAC key and the HMAC algorithm previously stored in the server's encrypted database 304 to recalculate the HMAC. A successful comparison of the HMAC generated by the client instance against the HMAC generated by the server may therefore validate the authorization token, while an unsuccessful comparison indicates the authorization token is not valid.

Figure 4:
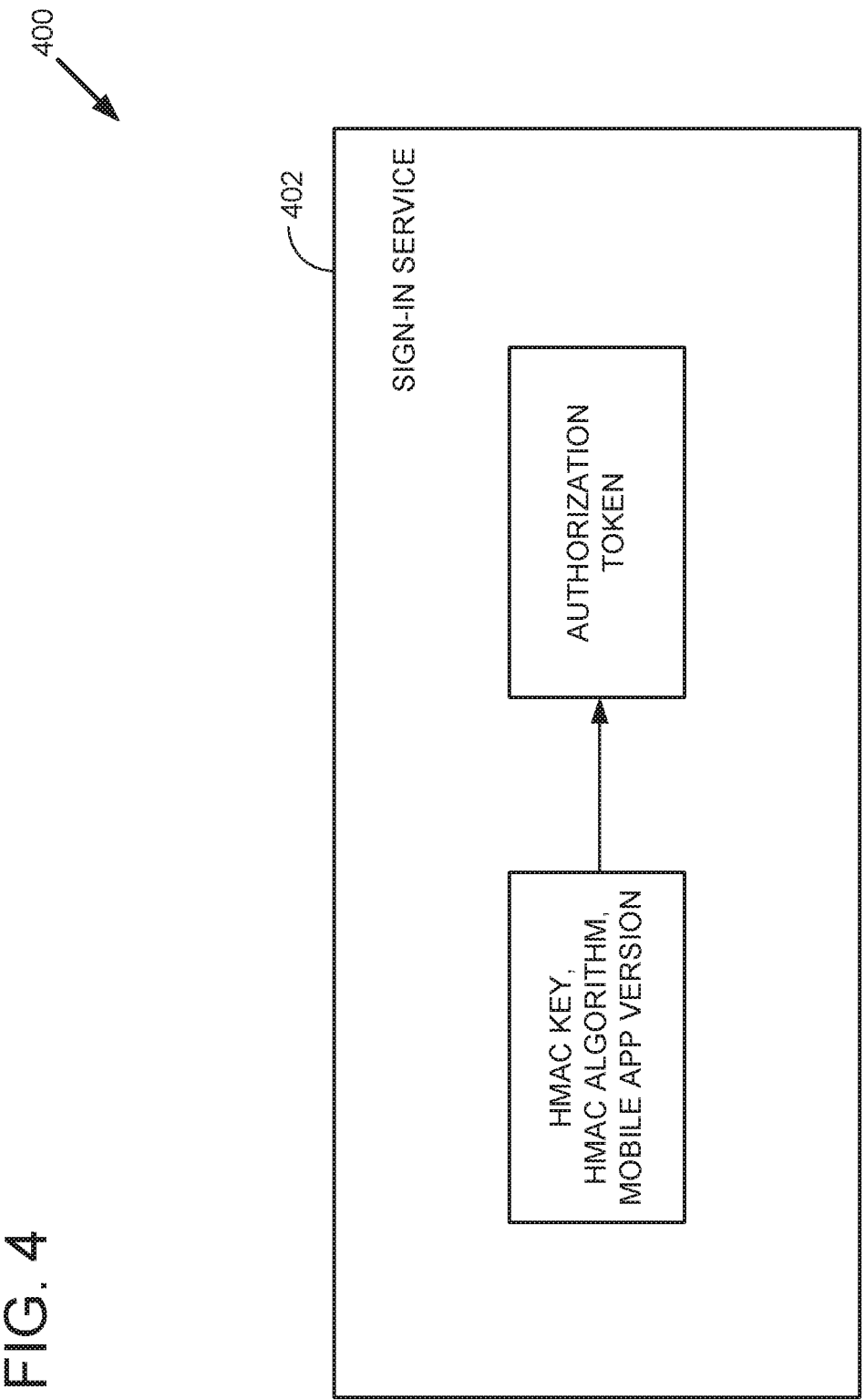
FIG. 4 is a diagrammatic representation of a customized sign-in service, in accordance with a disclosed embodiment.

FIG. 4 is a diagrammatic representation of a customized sign-in service, in accordance with a disclosed embodiment. Embodiments may change the conventional sign-in service to enhance security. When a user signs in to an online publication and commerce system, for example, the modified sign-in service 402 may store the HMAC key, the HMAC algorithm, and the application version number of the client application instance, in the authorization token attributes. (Token attributes may comprise key and value pairs, and are generally sent in hashed form rather than plaintext to prevent visibility. Hashing operations are generally very fast, and thus do not present a computational bottleneck.) The client application instance may then calculate an HMAC using these attributes and send the HMAC with a service request.

When a server receives such a service request, it can separately calculate the HMAC using the received authorization token attributes included with the service request, and compare the calculated HMAC with the HMAC sent by the client as previously described. That is, in this embodiment, the server need not look up the HMAC key and the HMAC algorithm associated with a particular client instance in its encrypted database 304. This approach thus decreases the time required by the server to validate service requests and increases overall computational efficiency.

Figure 5:
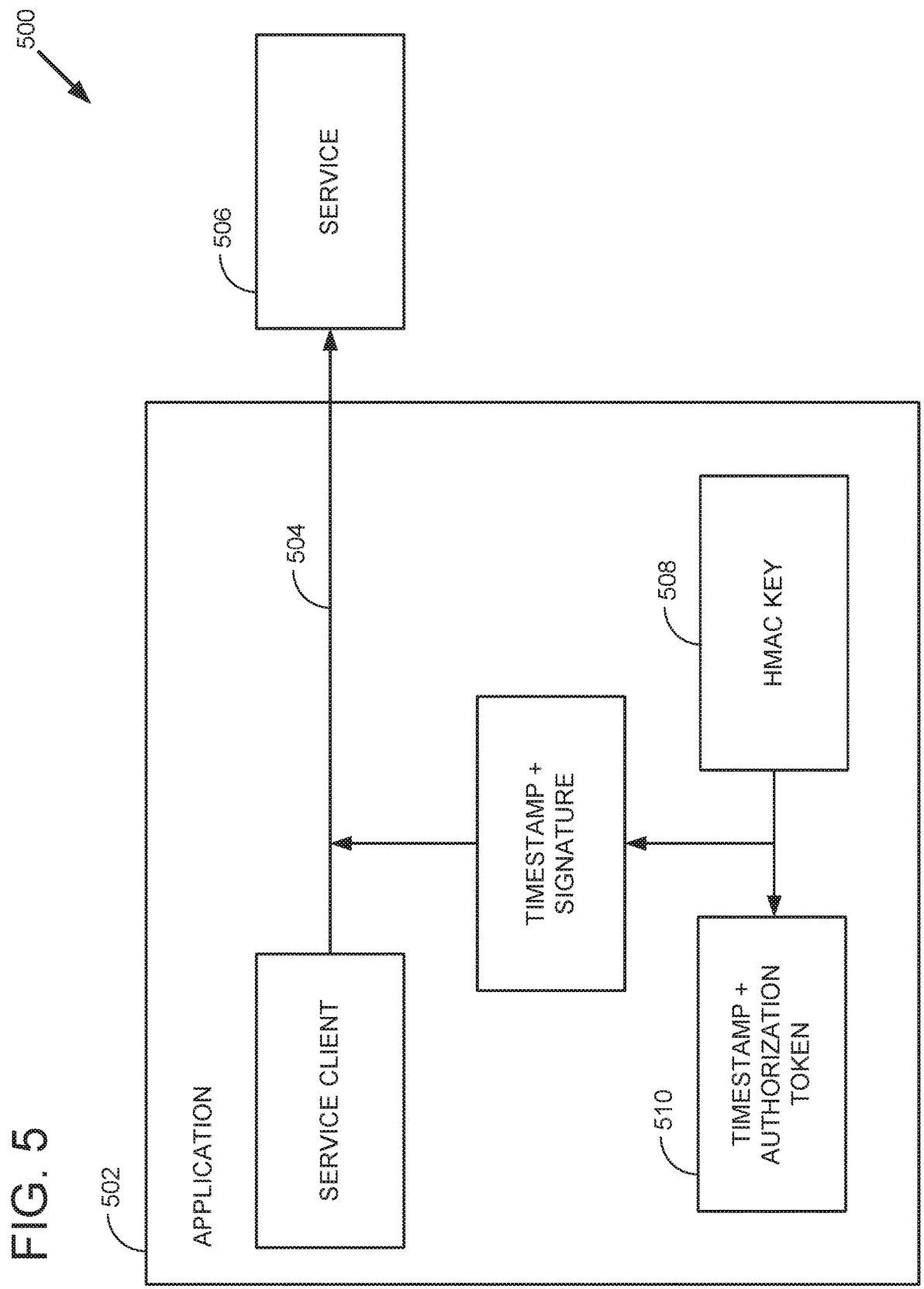
FIG. 5 is a diagrammatic representation of a system for generating customized service requests, in accordance with a disclosed embodiment.

FIG. 5 is a diagrammatic representation of system for generating customized service requests, in accordance with a disclosed embodiment. The client mobile application instance 502 executing on a client device may generate a service request 504 to request data from a service 506. The service request 504 may include a service request header that includes a timestamp indicating the current time on the client device when the service request is being generated. HMAC key 508 may produce an HMAC 510 of the timestamp and the authorization token that would normally be produced from the HMAC key 508 and the HMAC algorithm as previously described. That is, HMAC 510=HMAC (timestamp+authorization token without timestamp). The client mobile application instance 502 may then send the HMAC 510 along with the timestamp and the regular signature in a service request header as part of the service request 504.

Figure 6:
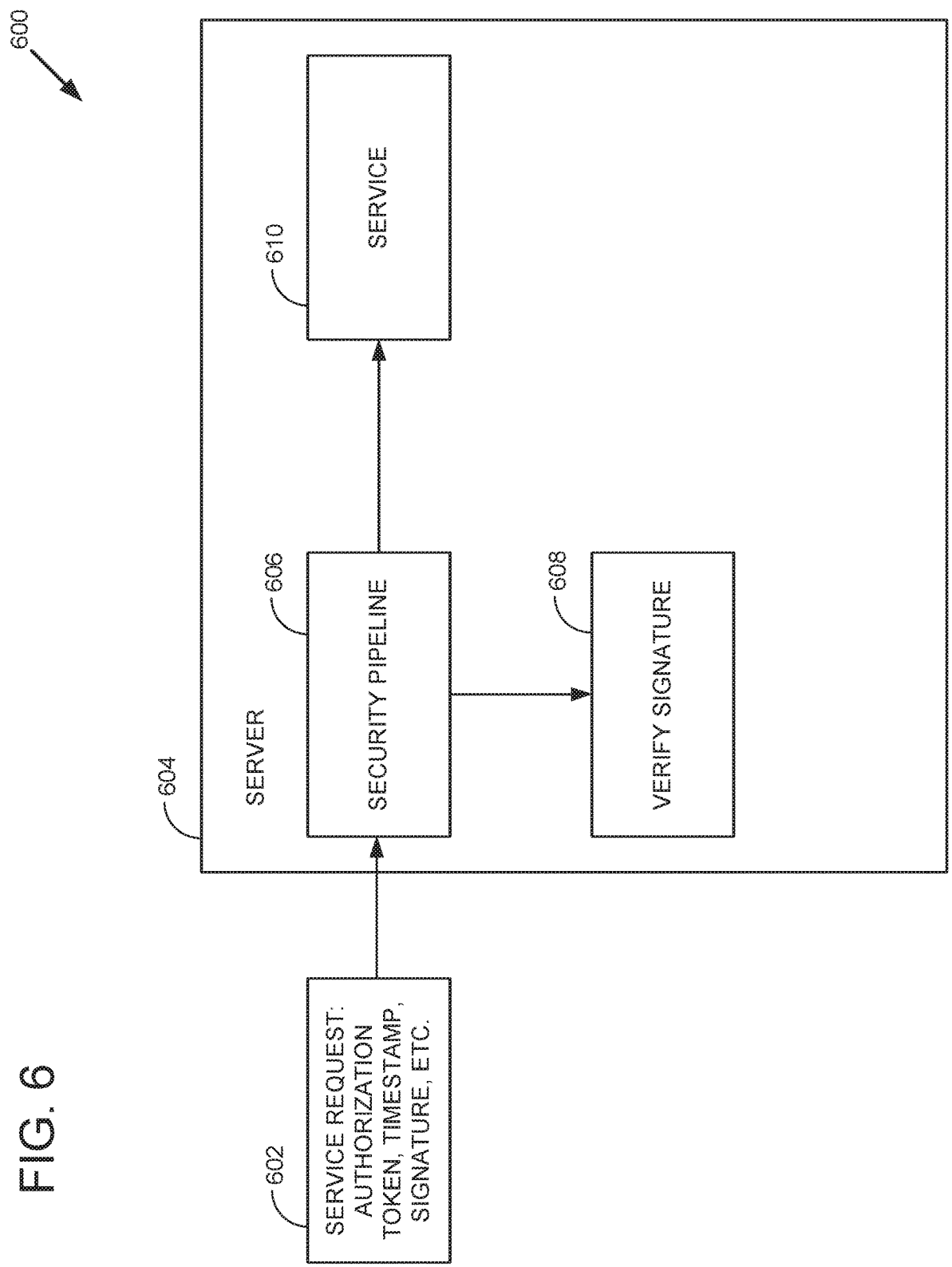
FIG. 6 is a diagrammatic representation of a system for responding to incoming customized service requests, in accordance with a disclosed embodiment.

FIG. 6 is a diagrammatic representation of system for responding to incoming customized service requests, in accordance with a disclosed embodiment. An incoming service request 602 comprising the authorization token, timestamp, and signature may arrive at an application server 604 from a client instance. The application server's security pipeline 606 may receive the incoming service request 602 and verify the signature at comparator 608 and check the timestamp against the current server time. If the timestamp in the service request matches the current time at the application server within a predetermined time span, the incoming service request is less likely to be an old copy of a valid service request that is simply being fraudulently re-used. The predetermined time span may be five minutes, for example, to ensure the scheme will work in case the server and client have slightly different local clock times.

The server 604 may thus reject the service request 602 as invalid for having either an expired timestamp or an HMAC mismatch. That is, the HMAC acceptance by the server 604 is a function of both the timestamp and the authorization token paired together, based on calculations that may be performed independently by both the client and the server. This approach may further ensure that the incoming service request is actually from an authorized client instance. If the service request 602 is validated, service 610 is authorized and may be performed by the server 604.

In one embodiment, the server may execute the service request without requiring validity, if the requested data is freely available to anyone. For example, if the request is for an item listing in an online catalog, the server may provide the item listing regardless of whether the request has been validated. In another embodiment, the service request may include a hashed version of the DeviceID, so that the server may determine the origin of the service request is known to be a rogue client. This feature enables the server to selectively ignore requests coming from client instances that use an authorization token associated with the DeviceID. The DeviceID may be from a malicious client device, for example, that is participating in a denial of service attack, in which large numbers of service requests rapidly bombard a server. Such attacks may include service requests for freely available data. The server may also flag incoming service requests as suspicious if associated with a particular DeviceID, and require higher security than usual for validating such service requests. The server may also prioritize service requests according to the DeviceID, which may be associated with a particular service level.

Figure 7:
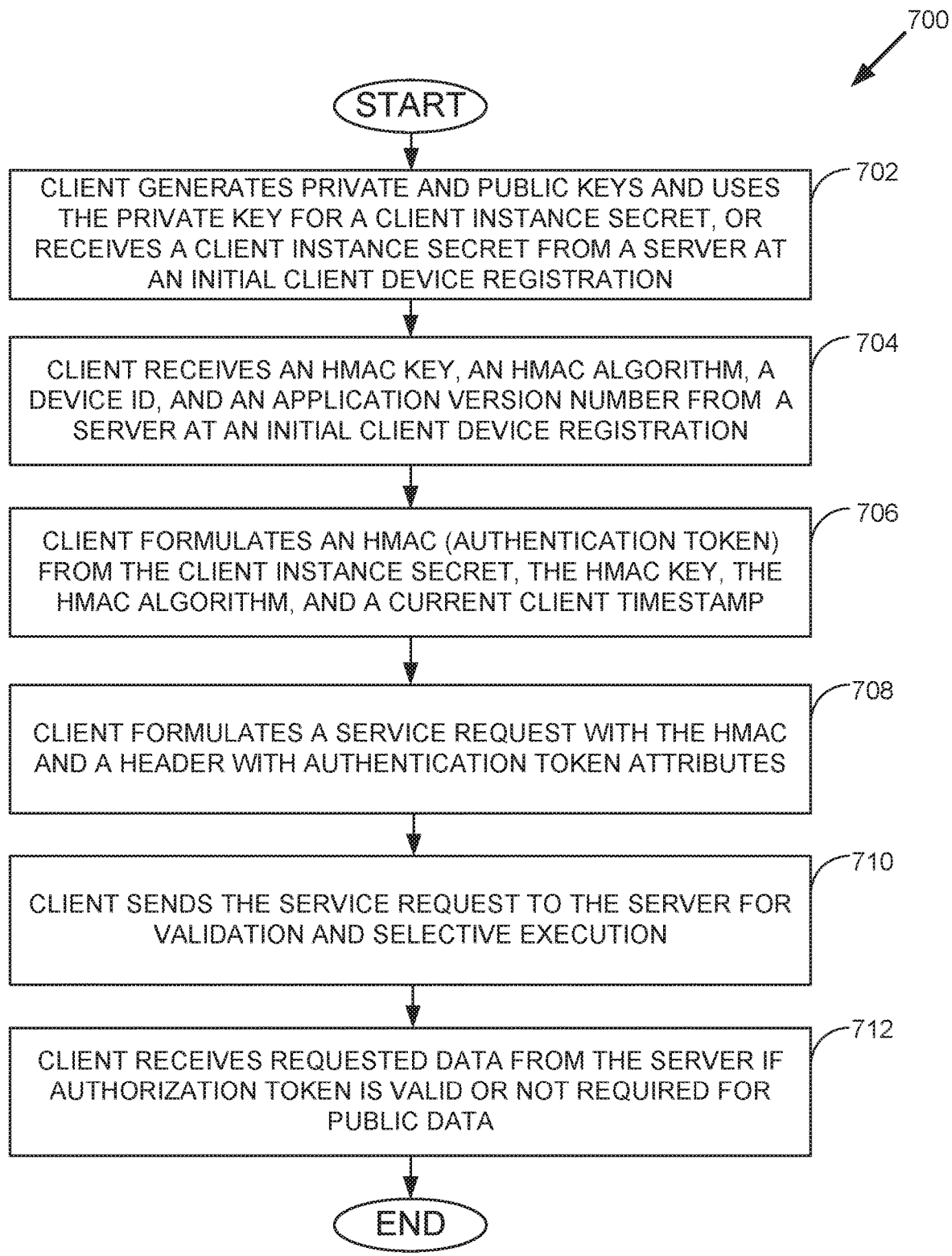
FIG. 7 is a flow chart of a method for generating customized service requests, in accordance with a disclosed embodiment.

FIG. 7 is a flow chart of a method for generating customized service requests, in accordance with a disclosed embodiment. The method generally follows the operation of the system described above, and may be implemented as a set of program instructions that are stored in a computer-readable medium and executed by at least one processor.

At 702, the method may begin with a client instance generating private and public keys, and using the private key as the secret for formulating an authorization token. The client may send the public key to a server. In another variation, the client instance may instead receive a client instance secret from a server, once, at an initial client device registration. The client does not share the client instance secret. At 704, the method may further comprise the client instance receiving an HMAC key and an HMAC algorithm from a server at an initial client device registration. The client instance may also receive a DeviceID and an application version number from the server.

At 706, the client instance may formulate an HMAC (i.e., authentication token) from the client instance secret, the HMAC key, the HMAC key, and a current client timestamp. The client instance secret helps ensure that the HMAC cannot be formulated by another client, and the timestamp helps ensure that the HMAC may not be validated after a short time span. At 708, the client instance may formulate a service request with the HMAC and a service request header including authentication token attributes.

At 710, the client instance may send the service request to the server for validation and execution if found valid. In some cases, such as for service requests for public data not arriving from known rogue clients, validation may not be needed for the server to comply with the service request. The server may however selectively ignore service requests that are suspicious are from known rogue client instances, such as to prevent denial of service attacks. At 712, the method may conclude when the client receives the requested data from the server. The method may however be repeated at least in part for generation of subsequent service requests.

Figure 8:
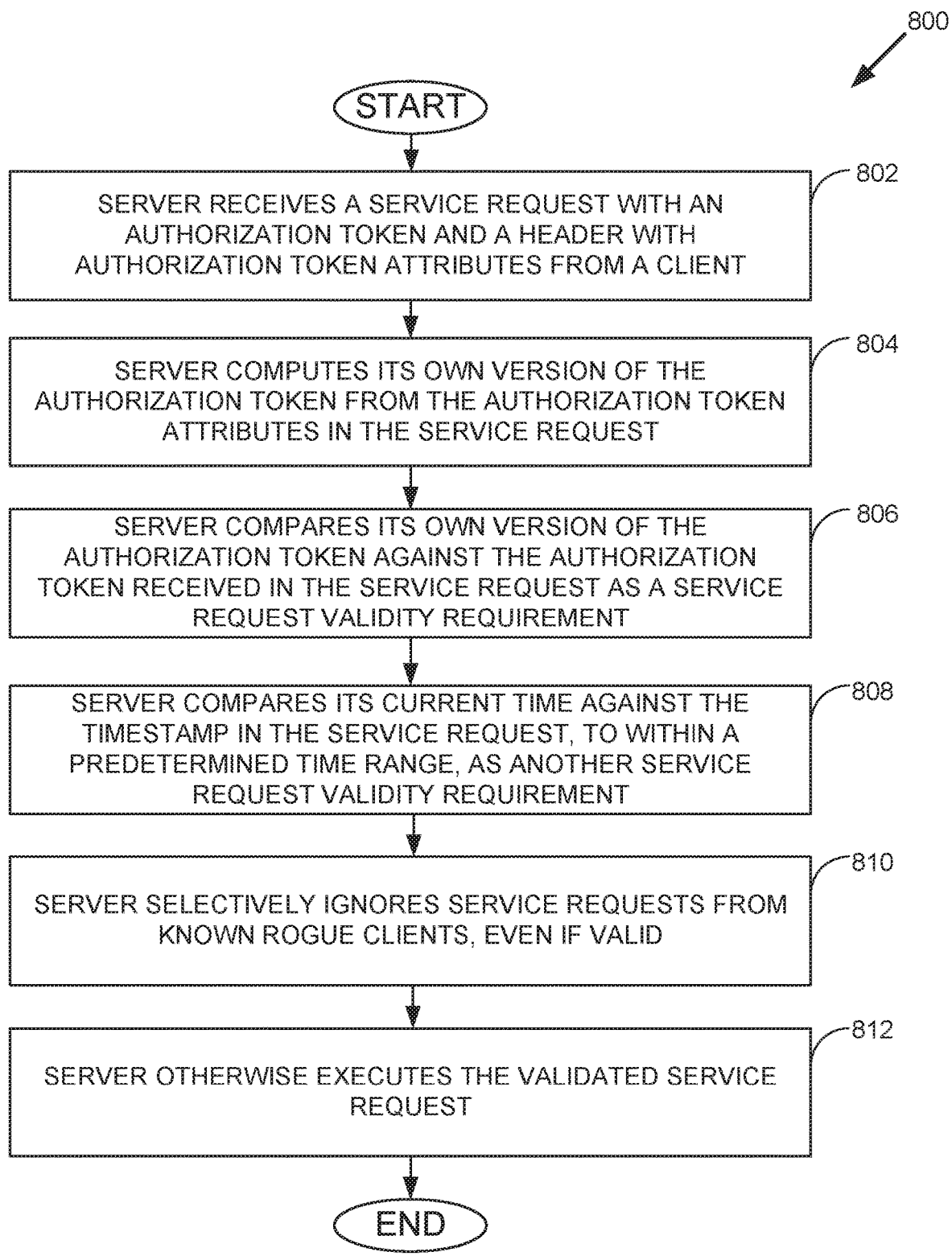
FIG. 8 is a flow chart of a method for responding to incoming customized service requests, in accordance with a disclosed embodiment.

FIG. 8 is a flow chart of a method for responding to customized incoming service requests, in accordance with a disclosed embodiment. The method generally follows the operation of the system described above, and may be implemented as a set of program instructions that are stored in a computer-readable medium and executed by at least one processor.

At 802, the method may begin with a server receiving a service request with an authorization token and a header with authorization token attributes, from a client instance. At 804, the server may compute its own version of the authorization token from the authorization token attributes in the service request. That is, the server need not retrieve the HMVAC key or the HMAC algorithm from its own database.

At 806, the server may compare its own version of the authorization token against the authorization token received in the service request. A successful comparison is required as one condition for service request validation. An unsuccessful comparison indicates the service request is not valid and should not be executed. At 808, the server may compare its current time against the timestamp in the service request, to determine if the times match within a predetermined time span. A successful comparison of the times is required as another condition for service request validation. An unsuccessful comparison invalidates the service request, as it indicates that the authorization token may be the subject of fraudulent re-use.

At 810, the server may selectively ignore service requests from known rogue client instances, even if validated. At 812, the method may end when the server executes the validated service request, and sends the requested data to the client instance.

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of some of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various APIs), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Example embodiments may use the Open Systems Interconnection (OSI) model or Transfer Control Protocol/Internet Protocol (TCP/IP) protocol stack model for defining the protocols used by a network to transmit data. In applying these models, a system of data transmission between a server and client, or between peer computer systems, may, for example, include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally Asynchronous Transfer Mode (ATM), Systems Network Architecture (SNA), Serial Digital Interface (SDI), or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the embodiment. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Figure 9:
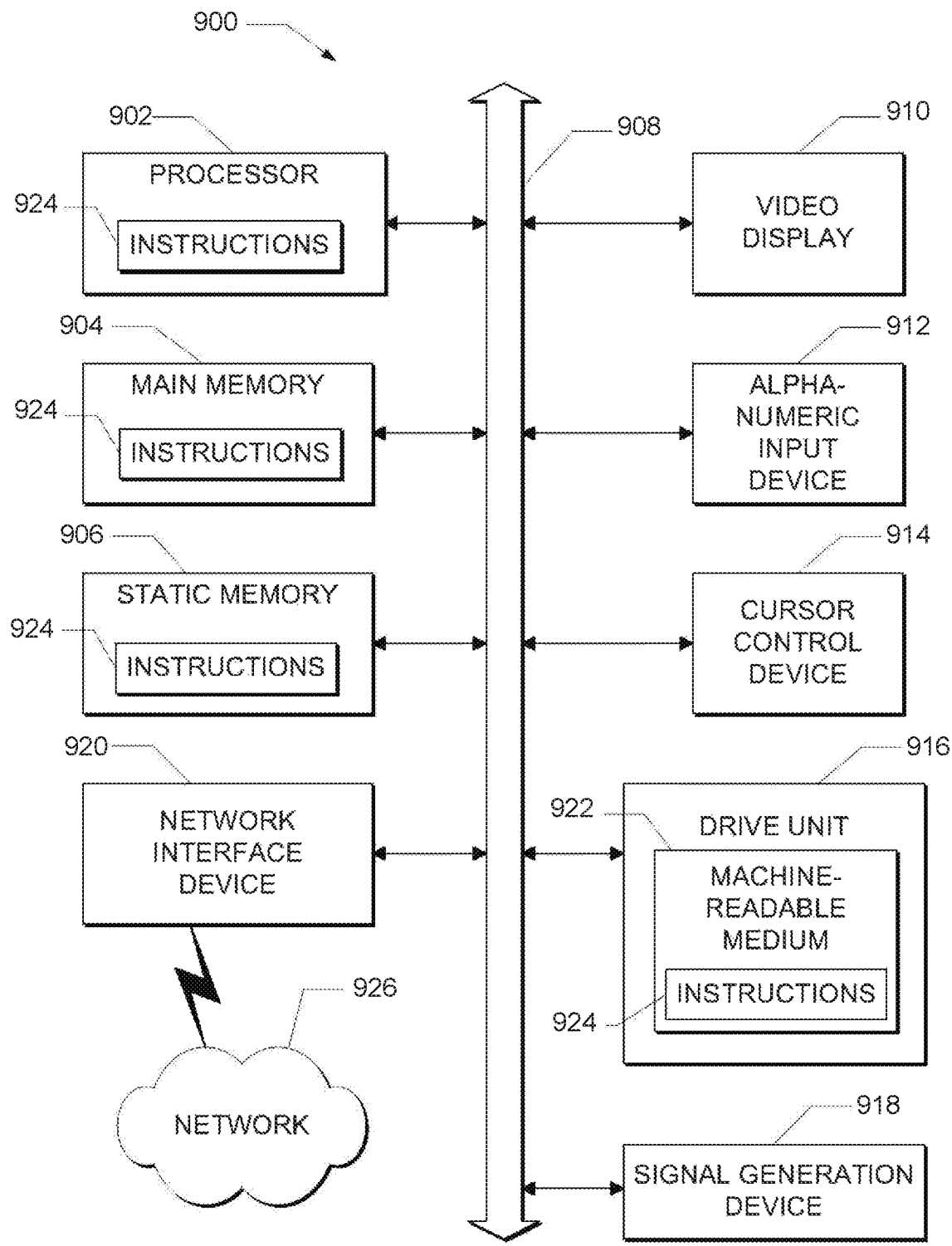
FIG. 9 is a block diagram of a machine in the example form of a computer system within which a set of instructions for causing the machine to perform any one or more of the customized methodologies discussed herein, may be executed.

FIG. 9 shows a diagrammatic representation of a machine in the example form of a computer system 900 within which a set of instructions, for causing the machine to perform any one or more of the customized methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., CPU, a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions (e.g., software 924) embodying any one or more of the methodologies or functions described herein. The software 924 may also reside, completely or at least partially, within the static memory 906, the main memory 904, and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, and optical and magnetic media.

Figure 10:
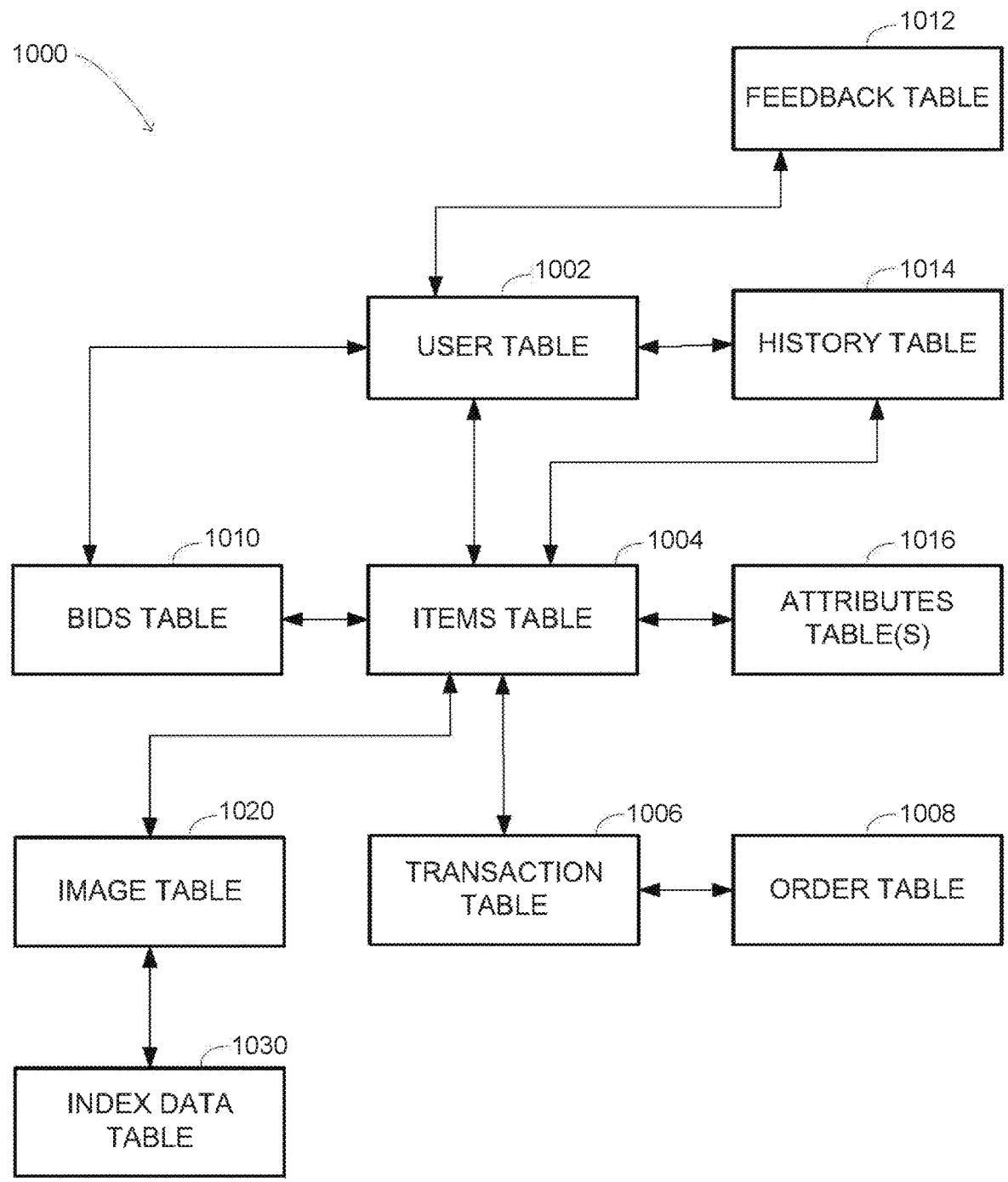
FIG. 10 is a diagrammatic view of a data structure, according to an example embodiment of a network-based marketplace.

FIG. 10 is a high-level entity-relationship diagram of an example embodiment, illustrating various tables 1000 that may be maintained within the databases 35 to 37, and that are utilized by and support the applications 30 and 32. A user table 1002 contains a record for each registered user of the network-based marketplace platform 12, and may include identifier, address, and financial instrument information pertaining to each such registered user. A user may operate as a seller, a buyer, or both, within the network-based marketplace platform 12. In one example embodiment, a buyer may be a user that has accumulated value (e.g., commercial or proprietary currency), and is accordingly able to exchange the accumulated value for items that are offered for sale by the network-based marketplace platform 12. The user table 1002 may also contain sensor data for a user.

The tables 1000 also include an items table 1004 in which are maintained item records for goods and services that are available to be, or have been, transacted via the network-based marketplace platform 12. Each item record within the items table 1004 may furthermore be linked to one or more user records within the user table 1002, so as to associate a seller and one or more actual or potential buyers with each item record.

The items table 1004 may be connected to an image table 1020, which contains images associated with the respective items or item listings in the items table 1004. The image table 1020 is in turn connected to an index data table 1030, which contains index data as described in detail above.

A transaction table 1006 contains a record for each transaction (e.g., a purchase or sale transaction) pertaining to items for which records exist within the items table 1004. The transaction table 1006 may also contain recommendations that have been provided to the user based on physical activity determined from sensor data and on products purchased by other similar users.

An order table 1008 is populated with order records, with each order record being associated with an order. Each order, in turn, may correspond to one or more transactions for which records exist within the transaction table 1006. The order table 1008 may also contain indications of whether an order was based on a recommendation provided based on sensor data.

Bid records within a bids table 1010 each relate to a bid received at the network-based marketplace platform 12 in connection with an auction-format listing supported by an auction application 32. A feedback table 1012 is utilized by one or more reputation applications 50, in one example embodiment, to construct and maintain reputation information concerning users. A history table 1014 maintains a history of transactions to which a user has been a party. One or more attributes tables 1016 record attribute information pertaining to items for which records exist within the items table 1004. Considering only a single example of such an attribute, the attributes tables 1016 may indicate a currency attribute associated with a particular item, with the currency attribute identifying the currency of a price for the relevant item as specified by a seller.

Thus, a method and system to provide enhanced authorization token security in a network-based marketplace have been described. Although the present method and system have been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, the method comprising:
   transmitting a token, a hashing key, and a hashing algorithm to a client, wherein the hashing algorithm and the hashing key are included in the token;
   receiving a service request from the client, the service request comprising the token provided to the client, a signature generated by the client, and a client timestamp, the signature being generated based on the hashing key, the hashing algorithm, and the client timestamp;
   validating the signature by comparing the signature with a hash calculated by a server using the hashing key, the hashing algorithm, and the client timestamp; and
   in response to validating the signature, granting the service request.

2. The method of claim 1, further comprising sending a secret associated with the client to the client, and wherein the signature is generated further based on the secret.

3. The method of claim 1, further comprising sending to the client at least one of a device identifier and an application version number.

4. The method of claim 3, further comprising selectively invalidating service requests having a device identifier associated with a fraudulent client.

5. The method of claim 1, wherein the server retrieves the hashing key and the hashing algorithm from the token in the service request.

6. The method of claim 5, further comprising determining if the client timestamp and a current server time are within a predetermined time span.

7. The method of claim 6, wherein the predetermined time span comprises five minutes.

8. The method of claim 1, wherein the signature is generated further based on the token.

9. The method of claim 1, wherein the service request is for access to an online resource.

10. A non-transitory computer-readable storage medium having embedded therein a set of instructions which, when executed by at least one hardware-implemented processor of a computer, cause the computer to execute operations, the operations comprising:
    transmitting a token, a hashing key, and a hashing algorithm to a client, wherein the hashing algorithm and the hashing key are included in the token;
    receiving a service request from the client, the service request comprising the token provided to the client, a signature generated by the client, and a client timestamp, the signature being generated based on the hashing key, the hashing algorithm, and the client timestamp;
    validating the signature by comparing the signature with a hash calculated by a server using the hashing key, the hashing algorithm, and the client timestamp; and
    in response to validating the signature, granting the service request.

11. The medium of claim 10, wherein the operations further comprise sending a secret associated with the client to the client, and wherein the signature is generated further based on the secret.

12. The medium of claim 10, wherein the operations further comprise sending to the client at least one of a device identifier and an application version number.

13. The medium of claim 10, wherein the server retrieves the hashing key and the hashing algorithm from the token in the service request.

14. A system comprising:
a hardware-implemented processor and a memory that are configured to execute stored instructions to:
transmit a token, a hashing key, and a hashing algorithm to a client, wherein the hashing algorithm and the hashing key are included in the token;
receive a service request from the client, the service request comprising the token provided to the client, a signature generated by the client, and a client timestamp, the signature being generated based on the hashing key, the hashing algorithm, and the client timestamp;
validate the signature by comparing the signature with a hash calculated by the system using the hashing key, the hashing algorithm, and the client timestamp; and
in response to validating the signature, grant the service request.

15. The system of claim 14, further comprising sending a secret associated with the client to the client, and wherein the signature is generated further based on the secret.

16. The system of claim 14, further comprising sending to the client at least one of a device identifier and an application version number.

17. The system of claim 14, wherein the system retrieves the hashing key and the hashing algorithm from the token in the service request.

* * * * *